No. 807,162. PATENTED DEC. 12, 1905.
H. C. GARDNER.
APPARATUS FOR PROCESSING MEATS, &c.
APPLICATION FILED JUNE 7, 1902.
9 SHEETS—SHEET 1.
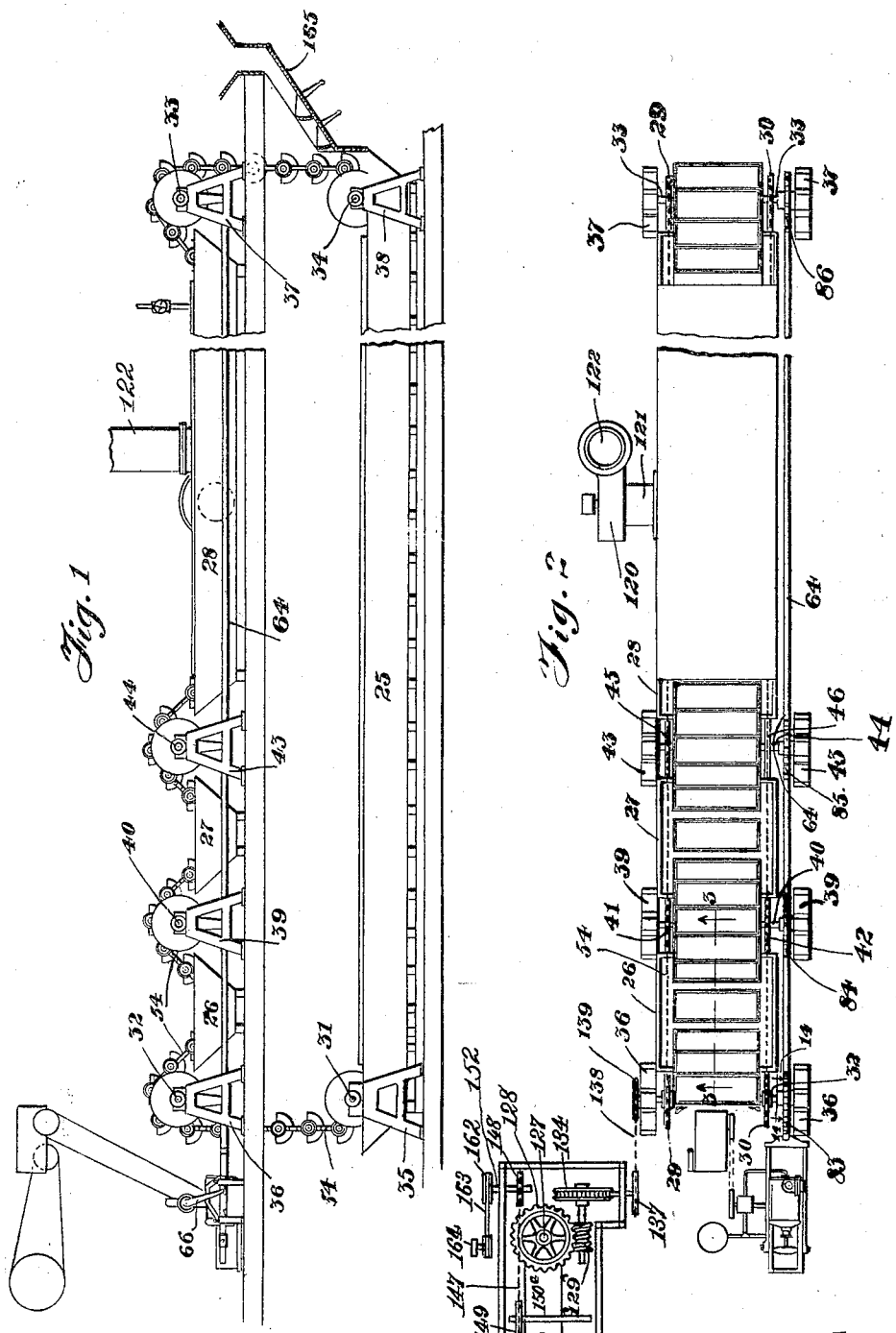
Witnesses.
Ira D. Perry
J. B. Weir
Inventor:
Horace C. Gardner
by Bond, Adams, Pickard & Jackson
Attys.

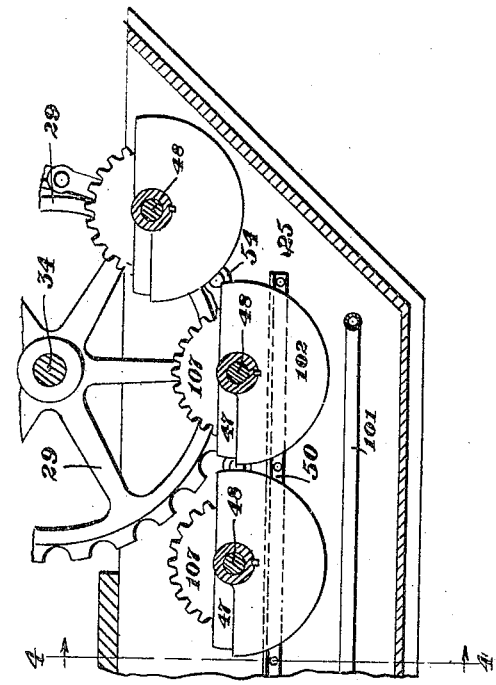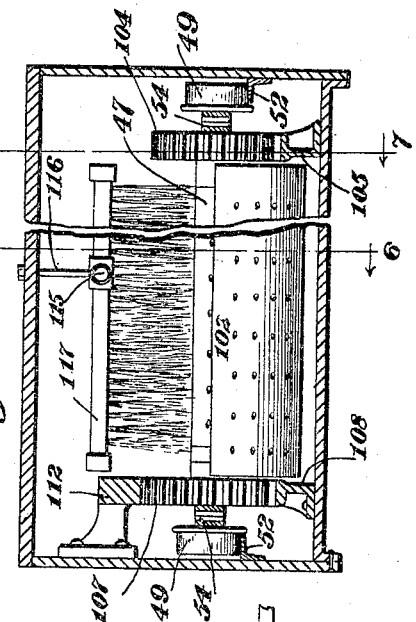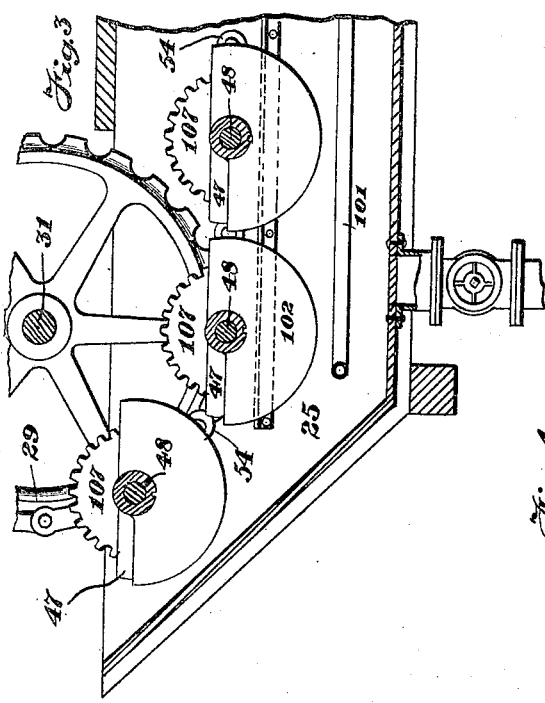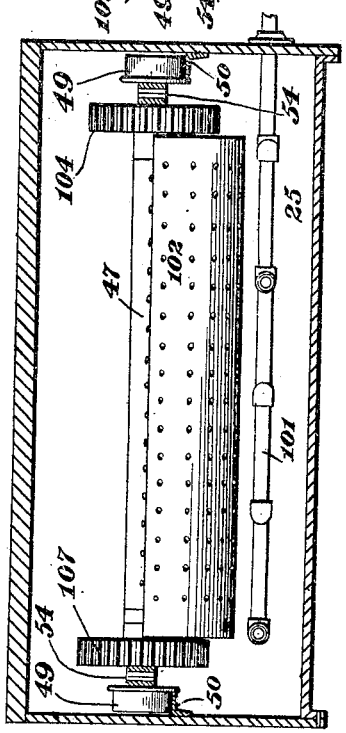

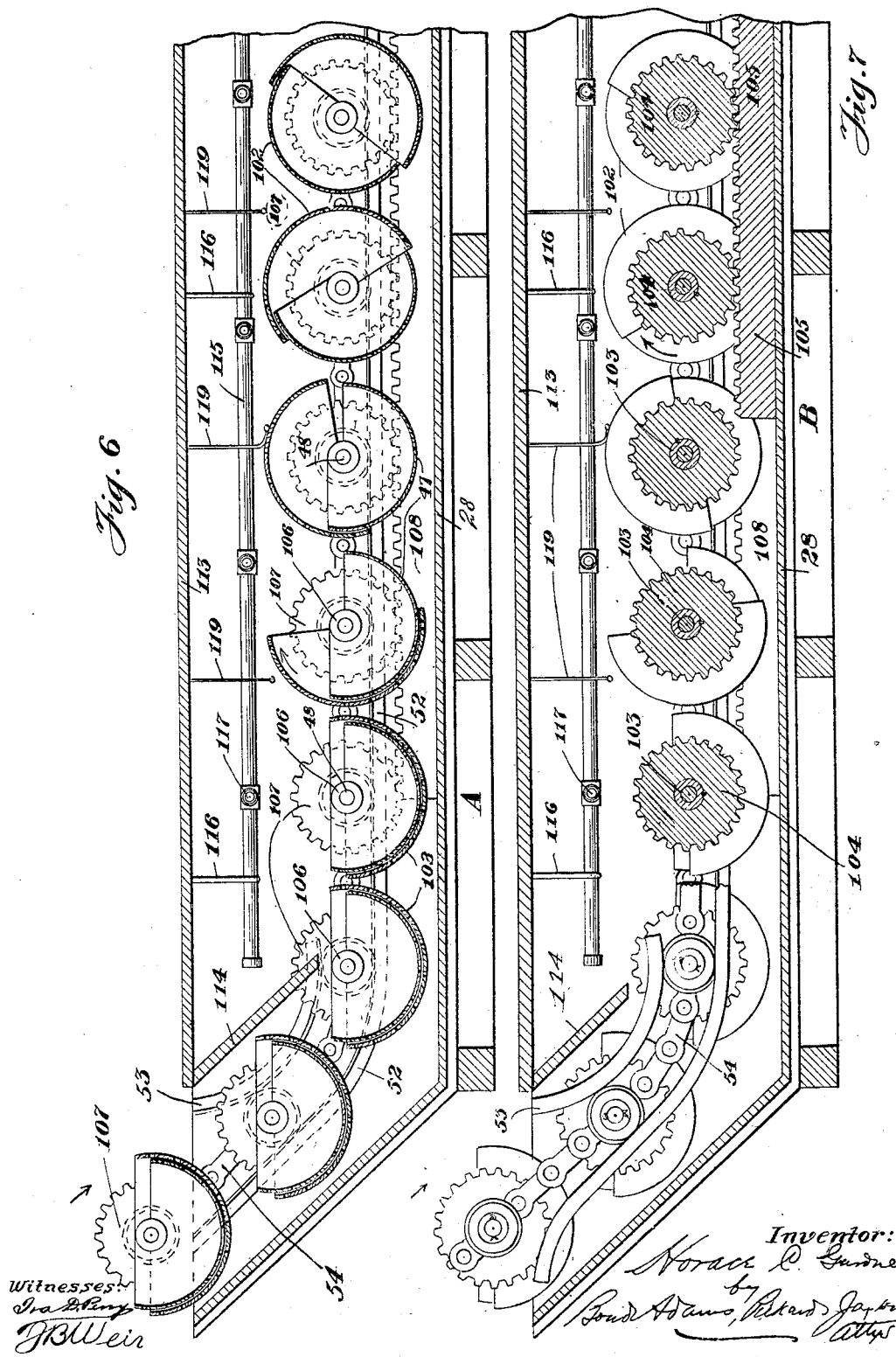

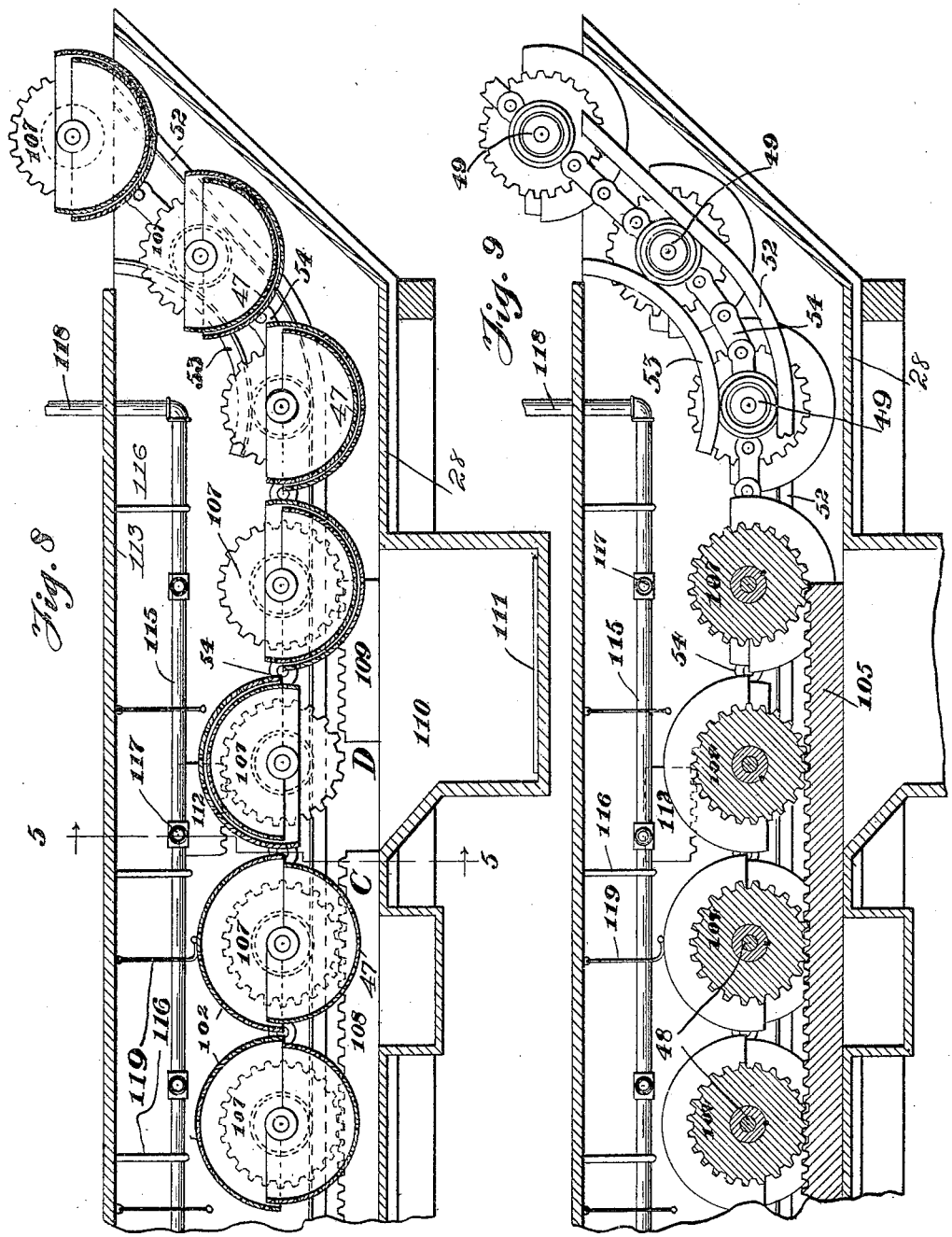

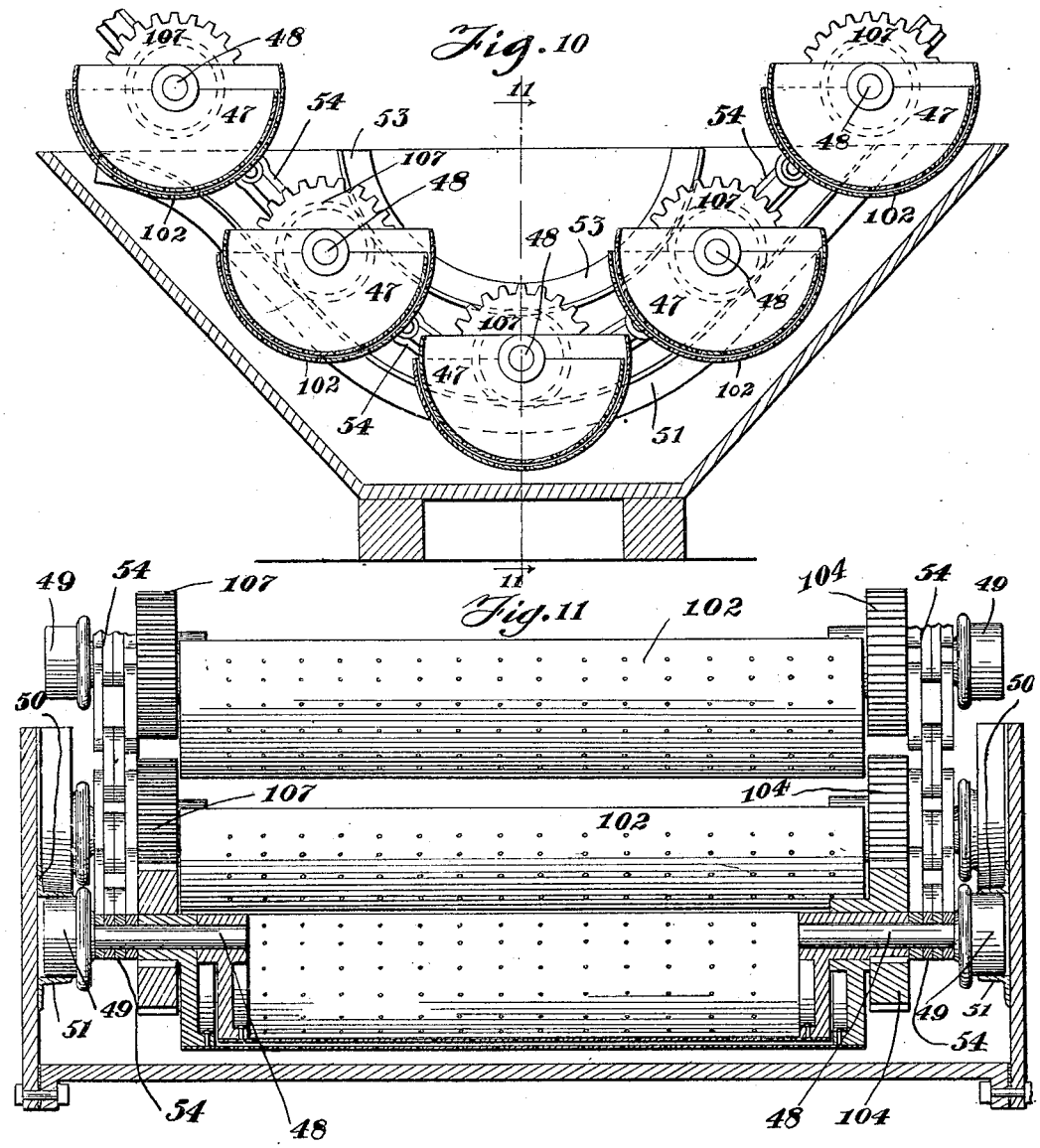

No. 807,162. PATENTED DEC. 12, 1905.
H. C. GARDNER.
APPARATUS FOR PROCESSING MEATS, &c.
APPLICATION FILED JUNE 7, 1902.
9 SHEETS—SHEET 6.
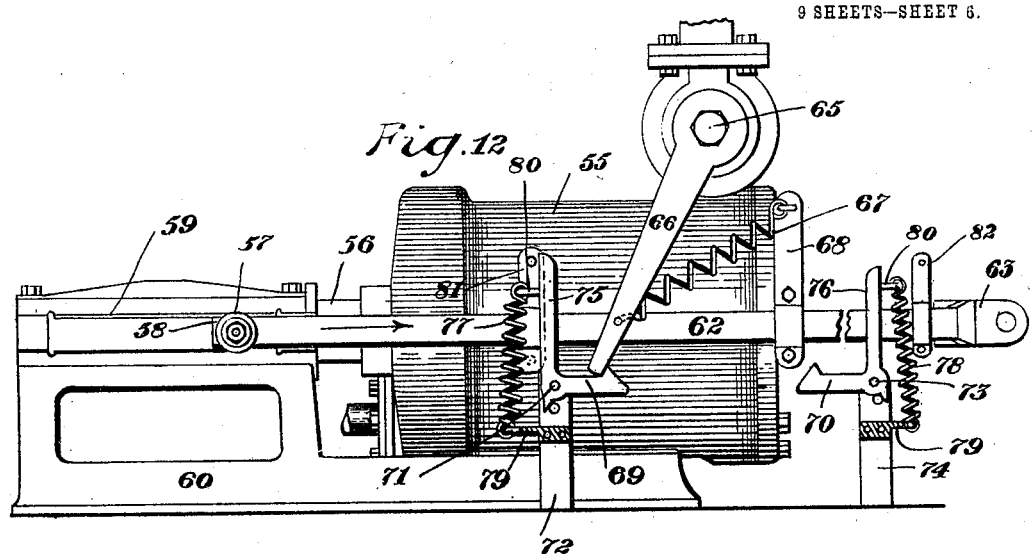
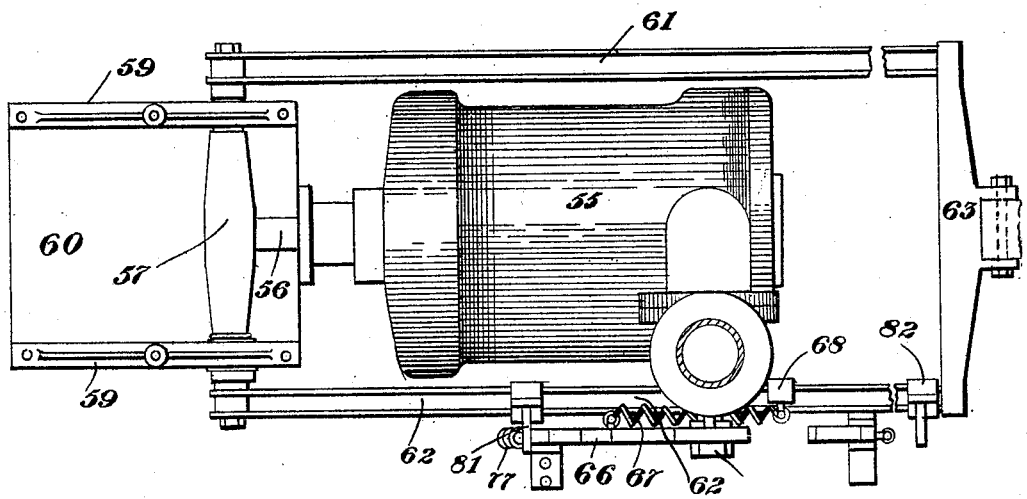
Witnesses:
Inventor:

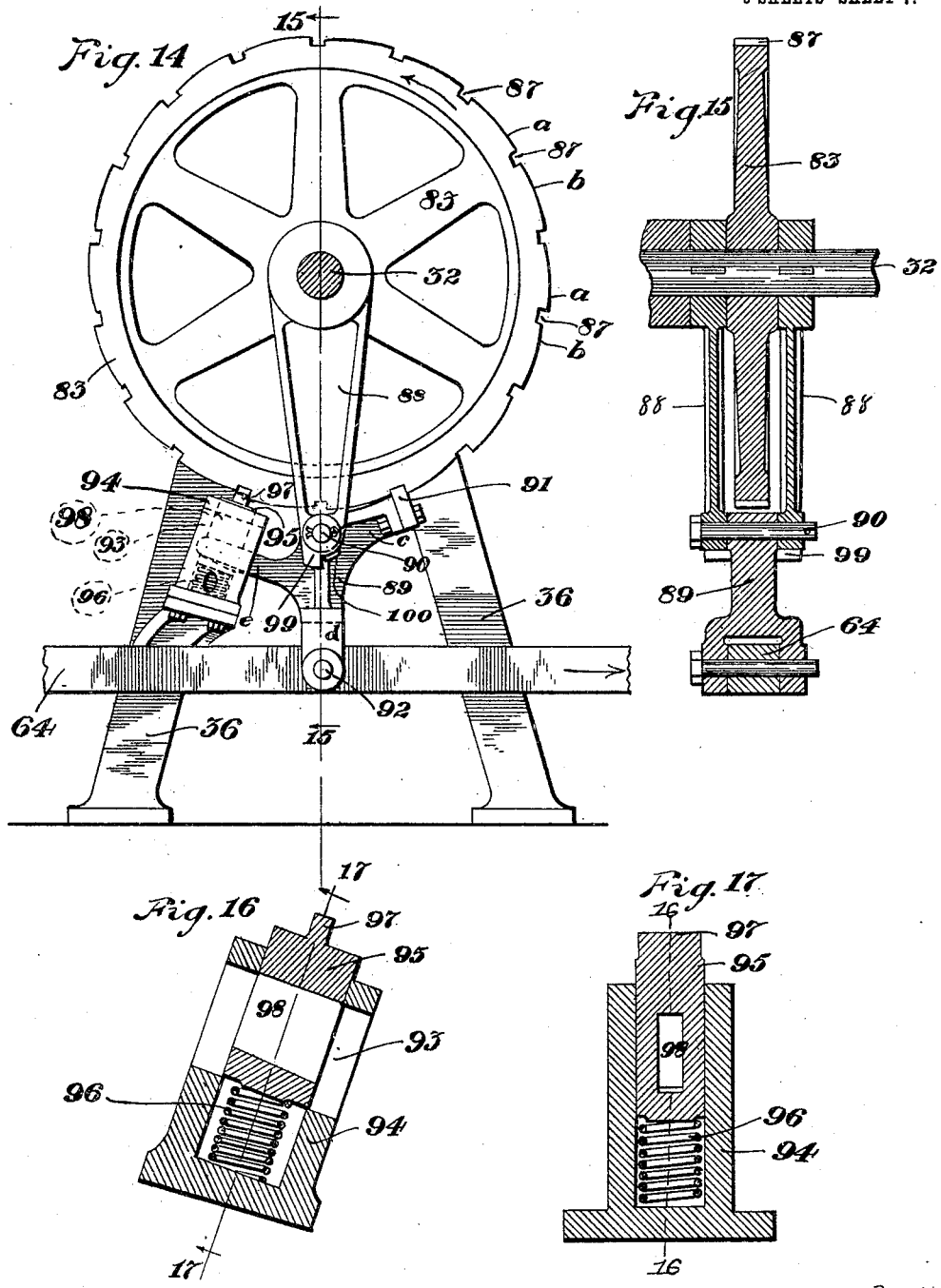

No. 807,162. PATENTED DEC. 12, 1905.
H. C. GARDNER.
APPARATUS FOR PROCESSING MEATS, &c.
APPLICATION FILED JUNE 7, 1902.
9 SHEETS—SHEET 8.
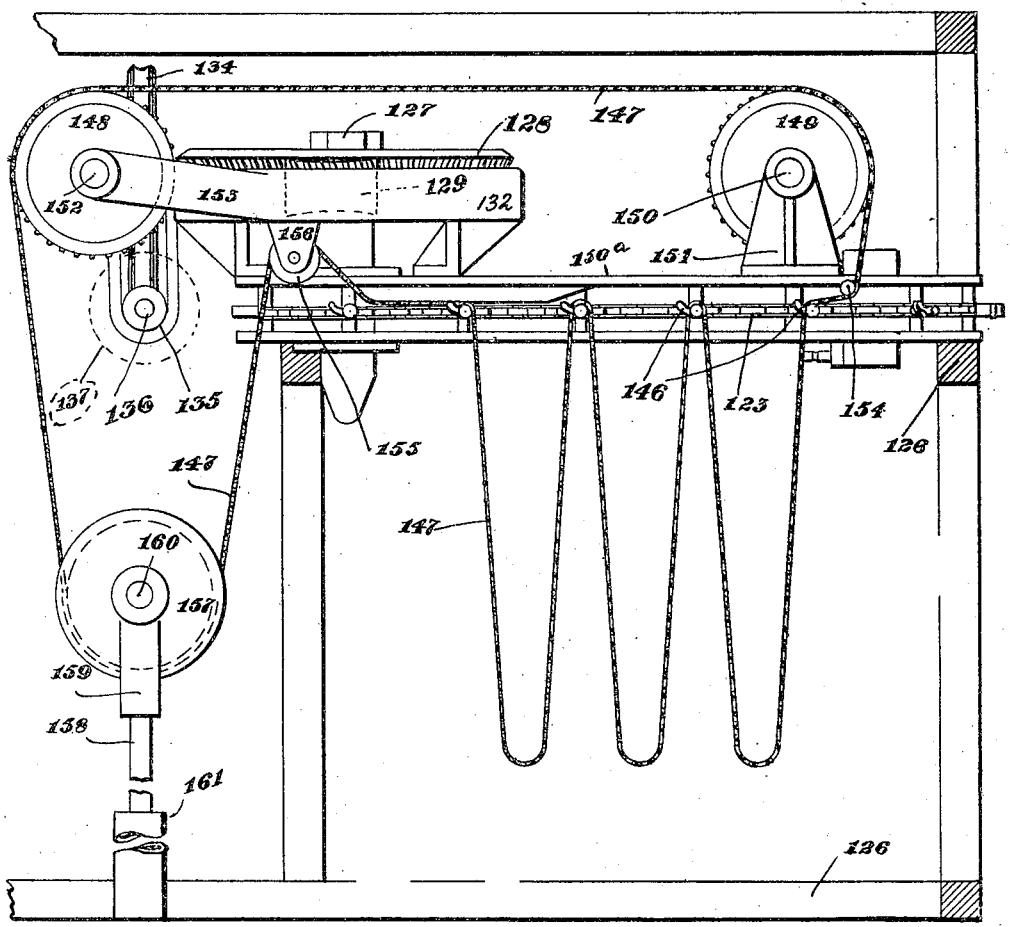
Fig. 18
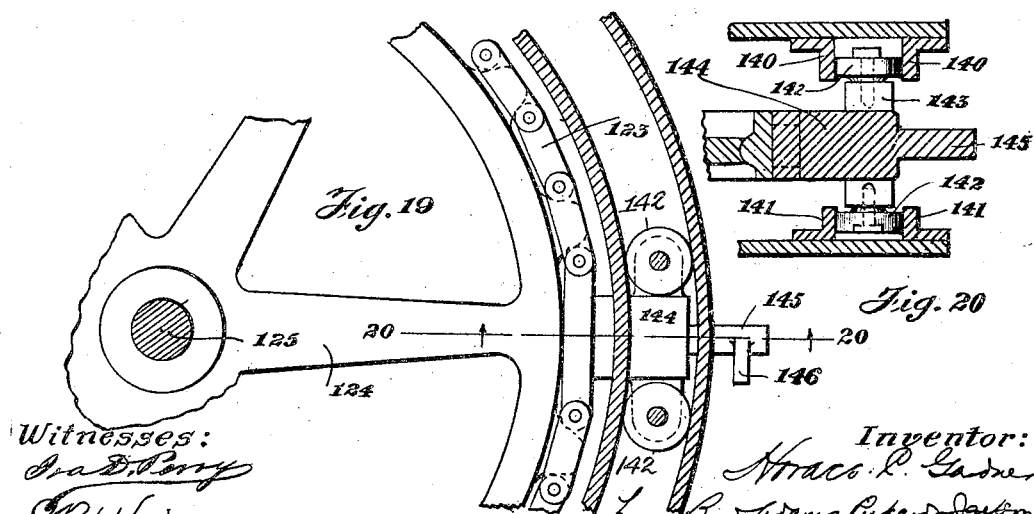
Fig. 19
Fig. 20
Witnesses:
Inventor:

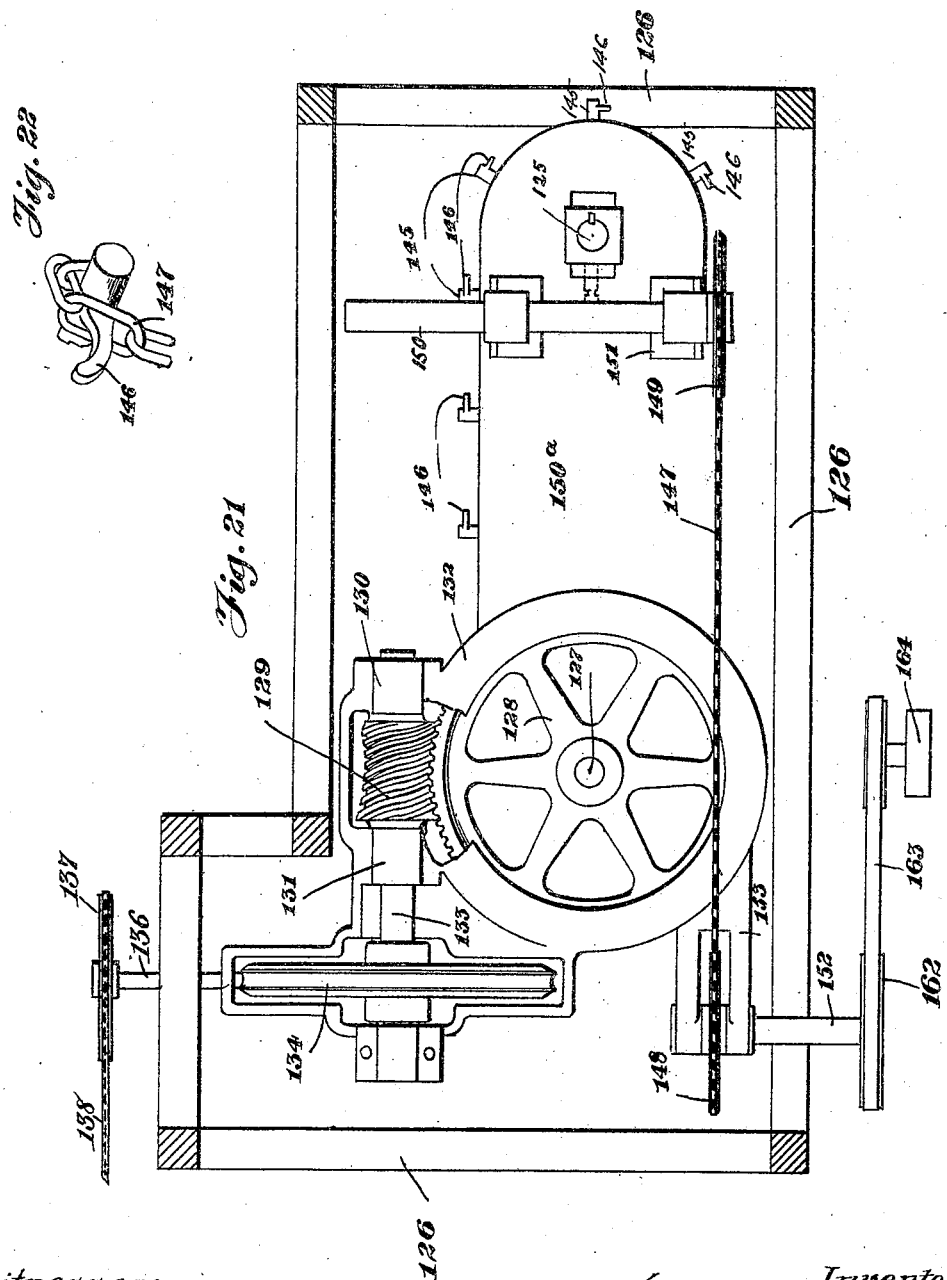

UNITED STATES PATENT OFFICE.

HORACE C. GARDNER, OF CHICAGO, ILLINOIS.

APPARATUS FOR PROCESSING MEATS, &c.

No. 807,162.     Specification of Letters Patent.     Patented Dec. 12, 1905.

Application filed June 7, 1902. Serial No. 110,618.

*To all whom it may concern:*

Be it known that I, HORACE C. GARDNER, a citizen of the United States, residing at Chicago, in the county of Cook and State of Illinois, have invented certain new and useful Improvements in Apparatus for Processing Meats, &c., of which the following is a specification, reference being had to the accompanying drawings.

My invention relates to machines for processing meats and other substances contained in cans or similar receptacles. It has special reference to means for processing involving the treatment of the contents of cans or other receptacles by cooking for a sufficient length of time and afterward cooling and cleaning the cans, so that the cans are delivered from the machine clean and ready for the lacquer with their contents properly processed.

My invention has for its object to provide improved mechanism by which the different steps of the operation may be carried on expeditiously and efficiently; and, among other things, it is my object to provide suitable mechanism for carrying out the process for preserving meats described in an application for patent filed by Edward Tilden, of even date herewith, Serial No. 110,632, filed June 7, 1902. Said Tilden process consists in rotating the receptacles or other substances while they are being cooled in order to effect a distribution of the jelly and fat throughout the contents of the can. An apparatus for accomplishing this rotation of the cans is one of the features of my invention.

Generally stated, my improved machine consists of a processing-tank of considerable length through which the "cans," by which term I mean to include tin cans or other equivalent receptacles, are carried in baskets, the baskets being connected together by endless chains or belts in the form of an endless series. The arrangement is such that the baskets each contain a large number of cans which enter the processing-tank at one end and pass out of it at the other end, the rate of progression being slow enough so that while the cans move through the tank they are subjected to the proper temperature for a sufficient length of time to cook them to the desired extent. The processing-tank is filled to a greater or less extent with liquid paraffin or equivalent liquid which does not vaporize depreciably at the temperature at which it is desired to process the cans, usually about 240° Fahrenheit. After passing out of the processing-tank the baskets pass through two washing-tanks successively, the first being filled with hot water and the second with an alkaline solution, preferably caustic soda, by this means the paraffin and grease being removed from the cans. They then pass into a cooling-tank, where the cans are cooled, and while cooling are rotated, so that the jelly and fat is distributed throughout the contents of the can instead of accumulating in a mass, as is the case where the cans are not rotated while cooling. During their passage through the tank the cans are subjected to a blast of air, so that by the time they pass out of the cooling-tank they are thoroughly cooled. In addition to the blast of air they are also subjected to a spray of cold water, which expedites the cooling operation. After having been cooled the cans are discharged upon a suitable conveyer by the tilting of the baskets. In my improved machine the baskets do not travel continuously, but progress intermittently, suitable ratchet mechanism being provided for producing this motion. I also provide suitable indicating mechanism by which the operator, at a point remote from the apparatus, may be advised of the speed at which the baskets are moving, this forming one of the important features of my invention.

Referring now to the drawings, in which my invention is fully illustrated, Figure 1 is a diagrammatic side elevation illustrating the arrangement of the parts of the apparatus. Fig. 2 is a plan view of the same. Fig. 3 is a partial longitudinal section of the processing-tank, illustrating also the baskets and parts of the driving mechanism therefor. Fig. 4 is a cross-section on line 4 4 of Fig. 3. Fig. 5 is a cross-section of the cooling-tank taken on line 5 5 of Fig. 8. Fig. 6 is a partial longitudinal section of the cooling-tank, showing the inlet portion thereof, said section being taken on line 6 6 of Fig. 5. Fig. 7 is a similar view, being a section taken on line 7 7 of Fig. 5. Fig. 8 is a similar view taken on line 6 6 of Fig. 5, showing the outlet portion of the cooling-tank. Fig. 9 is a similar view taken on line 7 7 of Fig. 5, showing also the outlet portion of the cooling-tank. Fig. 10 is a longitudinal section of one of the washing-tanks. Fig. 11 is a cross-section on line 11 11 of Fig. 10. Fig. 12 is a side elevation illustrating a part of the driving mechanism for operating the baskets. Fig. 13 is a plan view of the same. Fig. 14 is a sectional view taken on line 14 14 of Fig. 2, giving an inside view of the ratchet mechanism in side elevation. Fig. 15 is a section on line 15 15 of Fig. 14. Fig. 16 is a vertical section of the locking-dog which prevents reverse movement of the ratchet-wheel, being a section on line 16 16 of Fig. 17. Fig. 17 is a cross-section on line 17 17 of Fig. 16. Fig. 18 is a partial sectional view illustrating the indicating apparatus. Fig. 19 is an enlarged detail, being a partial sectional view illustrating the governor-wheel of the indicating apparatus. Fig. 20 is a section on line 20 20 of Fig. 19. Fig. 21 is a plan view, partly in section, showing the indicating apparatus; and Fig. 22 is a detail of a part of the indicating apparatus.

In the drawings, 25 indicates the processing-tank; 26, the hot-water washing-tank; 27, the caustic-soda washing-tank, and 28 the cooling-tank. In Fig. 1 I have illustrated the position in which I prefer to place said tanks, the processing-tank 25 being on the floor below that on which are placed the tanks 26, 27, and 28, the latter being arranged in line, preferably, directly over the processing-tank 25.

29 30 indicate sprocket-wheels placed at opposite sides of the tanks. There are four of each of said sprocket-wheels, two on each floor, for convenience of reference, the four sprocket-wheels at one side of the machine being indicated by the number 29 and those at the opposite side by the number 30. It will be understood that a pair of sprocket-wheels 29 30 is placed at each end of the processing-tank, a similar pair being placed at the inlet end of the tank 26 and another pair at the outlet end of the cooling-tank 28. Said sprocket-wheels are mounted on suitable shafts 31 32 33 34, as shown in Fig. 1. 35 36 37 38 indicate standards on which the said shafts are mounted, respectively.

39 indicates standards placed between tanks 26 27, upon which standards is supported a shaft 40, which carries sprocket-wheels 41 42 at its opposite ends, said sprocket-wheels being in the same vertical plane as the sprocket-wheels 29 30, respectively.

43 indicates standards placed between the tanks 27 28, which standards carry a shaft 44, upon which are mounted sprocket-wheels 45 46 in the same vertical plane as the sprocket-wheels 41 42, respectively, as best shown in Fig. 2.

47 indicates the can-holding baskets, as shown in Fig. 10, from which it will be seen that they are semicylindrical in shape and are perforated. The baskets 47 are suspended upon shafts 48, which are secured in the ends of the baskets and carry at their outer ends guide-rollers 49, as best shown in Fig. 11. The rollers 49 are adapted to run on suitable tracks provided in the different tanks.

50 indicates the tracks in the processing-tank, 51 the tracks in the washing-tanks, and 52 the tracks in the cooling-tank. (See Figs. 4, 5, and 10.) As shown in Figs. 9 and 10, the end portions of the tracks in the washing-tanks and in the cooling-tank are curved to properly guide the baskets as they move in and out of said tanks. Where said tracks curve, guide-rails 53 are provided above the rollers 49, as shown in Figs. 9 and 10. It will thus be seen that the baskets as they move into the tanks are guided downward to the lower portion thereof and as they pass out are again directed upward. The different baskets are connected in the form of an endless series by links 54, (best shown in Figs. 7 and 9,) a series of links being provided at each end of the baskets. The links 54 are adapted to fit upon the sprocket-wheels 29 30 41 42 45 46, which not only guide but also propel the baskets. Preferably the sprocket-wheels mounted above the ends of the processing-tank are idle, although, if desired, they also may be arranged to be driven. For driving the sprocket-wheels to propel the baskets I employ hydraulic-motor mechanism arranged to impart an intermittent motion to the baskets. The hydraulic motor is best shown in Figs. 1, 2, 12, and 13, the mechanism for tansmitting power to the baskets being shown in said figures, taken in connection with Figs. 14 to 17. The motor mechanism (illustrated in Figs. 1, 2, 12, and 13) consists of a cylinder 55, which operates a piston 56, which carries a cross-head 57, the latter having guide-blocks 58, moving in guides 59 in a suitable frame 60, as shown in Figs. 12 and 13. The ends of the cross-head 57 are connected by links 61 62 to a cross-head 63 at the opposite end of the cylinder, the latter cross-head being connected to a ratchet-bar 64, which extends endwise of the apartment and is placed adjacent to the tanks 26, 27, and 28, as shown in Figs. 1 and 2. The function of the ratchet-bar 64 is to operate the series of ratchet-wheels by which the baskets are moved along. In Figs. 1 and 2 I have illustrated diagrammatically the connections by which the hydraulic motor is operated; but inasmuch as the specific construction of the hydraulic motor forms no part of my present invention I have deemed it unnecessary to illustrate all the parts of the motor mechanism fully. So far as my present invention is concerned it is sufficient to say that the operation of the motor is controlled by a valve 65, operated by a lever 66, the arrangement being such that when the lever 66 stands in one position the piston 56 is caused to move in one direction, and when said lever is moved to the opposite position said piston is moved in the opposite direction. It will be understood that any suitable motor which may be operated in a similar manner may be employed. In the form of apparatus illustrated the lever 66 extends downward from the valve 65, which is placed above the cylinder 55 and is normally held in its forward position by a spring 67, one end of which is connected to the lever 66, the opposite end of said spring being connected to a standard 68, mounted on the link 62, as shown in Figs. 12 and 13. When the lever 66 is in the position shown in Fig. 12, the motor operates to move the piston in the direction indicated by the arrow in Fig. 12, while when said lever is inclined in the opposite direction the piston moves in the opposite direction. For holding the lever 66 in its different positions dogs 69 70 are provided, the dog 69 being mounted on a pivot 71, carried by a standard 72, placed beside the cylinder 55, while the dog 70 is mounted on a pivot 73, carried by a standard 74, also placed adjacent to the cylinder. The dogs 69 70 are provided, respectively, with upwardly-extending arms 75 76, as shown in Fig. 12, said arms being held in vertical position, with the dogs in horizontal position, by springs 77 78, respectively. The lower ends of the springs 77 78 are connected to lugs 79, carried by the standards 72 and 74, their upper ends being connected to lugs 80, projecting from the arms 75 76. The end portions of the dogs 69 70 are beveled, as shown in Fig. 12, so that when the lever 66 engages either of said dogs it depresses the dog, permitting the lever to pass into engagement therewith, such engagement being maintained by the action of the springs 77 78.

81 82 indicate arms carried by the link 62, as shown in Fig. 12. One of said arms is placed near the forward end of said link, while the other arm is placed a short distance from the rear end thereof. Said arms 81 82 serve to engage the upper ends of the arms 75 76, respectively, when the link 62 moves in one direction or the other and operate to rock the dogs 69 70 to release the lever 66 at the proper times.

The operation is as follows: When the link 62, moving in the direction indicated by the arrow in Fig. 12, reaches the limit of its movement in that direction, the arm 81 strikes the arm 75 and moves it forward slightly, rocking the dog 69 down out of engagement with the lever 66. Before the lever 66 is released it occupies the position shown in Fig. 12, the spring 67 being under tension and lying forward of the lever 66, so as to be in position to throw said lever forward when it is released. The spring 67 occupies this position for the reason that the standard 68, to which its upper end is connected, is mounted on the link 62, and consequently moves with said link. The standard 68 is so placed that when the link 62 is near the limit of its movement in the direction indicated by the arrow in Fig. 12 said standard lies forward of the valve 65, and when the link 62 reaches the limit of its movement in the opposite direction said standard lies at the opposite side of the valve 65. Consequently the spring 67 acts to move the lever 66 in one direction or the other, depending on the position of the standard 68. When the lever 66 is released from the dog 69, under the stress of the spring 67 it is thrown forward until it engages the dog 70, which then holds it until the link 62 reaches the limit of its movement in the opposite direction, when the arm 82 strikes the arm 76 of the dog 70, releasing the lever 66 and permitting it to swing in the opposite direction under the action of the spring 67. The valve 65 is of such construction that when the lever 66 moves forward into engagement with the dog 70 the proper connections are made, so that the motor operates to move the piston 56 back or to the left, while when the lever 66 occupies the position shown in Fig. 12, being then engaged by the dog 69, the proper connections are made, so that the piston 56 is moved forward or to the right. It will thus be seen that a reciprocating motion is automatically given to the piston 56 and links 61 62 and through them to the ratchet-bar 64. As will hereinafter appear, when the ratchet-bar 64 moves back or to the left it operates the ratchet-wheels to move the baskets forward, and when it moves in the opposite direction it does not operate said ratchet-wheels, and consequently moves freely. The ratchet-bar therefore moves forward quickly, but returns slowly. If desired, mechanism may be provided for effecting a quicker movement of the ratchet-bar when not acting to move the load.

The ratchet-wheels, through which the reciprocating motion of the ratchet-bar 64 is converted into a rotary motion and applied to the shafts 32, 40, 44, and 33, have the construction shown in Fig. 14. In said figure one of the ratchet-wheels is shown, its position being reversed, owing to the fact that an inside view thereof is illustrated. Before describing the construction of the ratchet-wheels I will explain that four ratchet-wheels 83, 84, 85, and 86 are provided, said ratchet-wheels being placed, respectively, on the shafts 32, 40, 44, and 33, as best shown in Fig. 2. The ratchet-wheel 83, which is typical of the others, is illustrated in Fig. 14, from which it will be seen that said wheel is provided with a series of notches 87 in its periphery, the surface of the wheel being lower behind each notch than in front of it, the higher portion being shown at $a$ and the lower portion at $b$ in Fig. 14. The ratchet-wheel 83 is provided with a lever 88, which is pivotally connected thereto at the center and depends therefrom, as shown in Fig. 14, carrying at its lower end a pawl 89, pivoted thereto by a pivot 90. The pawl 89 is in the form of a three-armed lever, its arms being indicated by $c$, $d$, and $e$, respectively. The arm $c$ extends over the periphery of the ratchet-wheel and carries a tooth 91, adapted to enter the notches 87, as shown in Fig. 14. The arm $d$ extends downward and is connected by a pivot 92 to the ratchet-bar 64. The arm $e$ extends forward and is adapted to project into a slot 93 in a frame 94, secured to the standard 36. The frame 94 carries a dog 95, which is fitted into said frame and is movable radially with reference to the ratchet-wheel 83, as best shown in Fig. 14. A spring 96 serves to force said dog toward the ratchet-wheel. Said dog carries a tooth 97, which is adapted to enter the notches 87 when said dog is in its outermost position. 98 indicates a slot in the dog 95, which slot lies in the path of the arm $e$ of the pawl 89, so that when said pawl is in the position shown in Fig. 14 the arm $e$ lies in the slot 98. As best shown in Fig. 14, the lever 88 has at its lower end a projecting lug 99, and the pawl 98 carries a lug 100, which lies back of the lug 99. When the pawl 89 is in the position shown in Fig. 14, so that the tooth 91 rests in one of the notches 87, the lug 100 then lies a short distance away from the lug 99, as shown in Fig. 14. At this time the arm $e$ is in engagement with the bottom of the slot 98 and acts to press back the dog 95, so that its tooth 97 moves out beyond the depressed portion $b$ of the periphery of the ratchet-wheel, although it does not clear the elevated portion $a$ thereof, thus permitting forward motion of the ratchet-wheel, but preventing backward motion thereof. When the ratchet-bar 64 is moved in the direction indicated by the arrow in Fig. 14, the pawl 89, being then in engagement with the ratchet-wheel 83, operates to rotate said wheel from one notch to the next. As the pawl 89 is so moved by the ratchet-bar the arm $e$ of said pawl moves out of the slot 98 in the dog 95, releasing said dog and permitting its tooth 97 to bear against the periphery of the ratchet-wheel under the stress of the spring 96, so that when the next notch 87 comes opposite the tooth the tooth enters it and locks the ratchet-wheel against movement. This takes effect at the completion of the stroke of the ratchet-bar 64. The pawl 89 is then returned by the reverse movement of the ratchet-bar, the arm $e$ of said pawl entering the slot 98 again and remaining inactive until the ratchet-bar is again moved in the direction indicated by the arrow in Fig. 14. When the ratchet-bar 64 reaches the limit of its movement in the direction opposite that indicated by the arrow in Fig. 14, the pawl 89 is swung upon its pivot 90 far enough to carry the tooth 91 out of operative position, this being permitted by the position of the lug 100 with reference to the lug 99, as shown in Fig. 14, the ratchet-wheel 83 being locked at this time against rotation by the dog 95. At the commencement of the movement of the ratchet-bar 64 in the direction indicated by the arrow in Fig. 14 the tooth 91 of the pawl 89 is moved into engagement with the ratchet-wheel, but the arm $e$ does not operate to withdraw the tooth 97 of the dog 95 from engagement with said ratchet-wheel until the tooth 91 of the pawl 89 enters one of the notches 87. This is due to the fact that the arm $e$ does not operate the dog 95 until it engages the bottom of the slot 98, and the slot is made long enough so that the operation above described is effected. It will thus be seen that the ratchet-wheel 83 is always locked against reverse movement, and it is also locked against forward movement except as it is operated by the pawl 89. This construction is particularly advantageous in an apparatus of the character described, as it sometimes happens that the load on the advance side of the ratchet-wheel is greater than that on the opposite side, and consequently the inequality of the load would tend to rotate the ratchet-wheel independently of the driving mechanism and disturb the arrangement of the slack between successive ratchet-wheels and interfere with the proper operation of the machine. By thus locking the ratchet-wheel such disarrangement cannot occur. Bearing in mind the fact that the ratchet-wheel 83, as shown in Fig. 14, is reversed, it will be seen that when the piston 56 moves in the direction opposite that indicated by the arrow in Fig. 12 the ratchet-wheel 83 will be advanced one notch, while when the piston moves in the opposite direction the pawl 89 will move back into engagement with the next-succeeding notch 87. It follows that as the piston 56 reciprocates the ratchet-wheel is given an intermittent rotary movement, and consequently the baskets are caused to progress intermittently through the different tanks. Similar connections are provided at each of the ratchet-wheels 84, 85, and 86, so that power is applied to each of the shafts 32, 40, 44, and 33. The advantage of thus applying power at a number of points is that the proper degree of slack in the chain of baskets is maintained at the desired points, and as the application of the power is distributed the strain upon the chain is also distributed, making it possible to use a lighter construction and prolonging the life of the apparatus.

101 indicates a series of pipes for heating the processing-tank 25, as shown in Figs. 3 and 4. Said pipes may be supplied with steam from any suitable source.

As best shown in Fig. 10, each of the baskets 47 is provided with a hood 102, said hoods being semicylindrical in form and being suspended upon the shafts 48, outside of the baskets 47. The hoods 102 are adapted to be inverted over the baskets to form with the baskets cylindrical receptacles for the cans. The hoods 102 are perforated similarly to the baskets 47. While the cans are being conducted through the processing-tank and also through the washing-tanks, the hoods 102 remain suspended below the baskets 47, as shown in Fig. 10. When passing through the cooling-tank, however, said hoods are inverted over the baskets 47 and are then rotated with the baskets, as will be hereinafter described.

I will now describe the cooling apparatus and the mechanism which operates to invert the hoods over the baskets and to rotate the hoods and baskets as they are carried through the cooling-tank.

As has been stated, the baskets are suspended from the short shafts 48, which are supported on the rollers 49. For rotating the basket it is provided at one end with a projecting sleeve 103, which extends a short distance beyond the edge of the basket and carries a pinion 104, as best shown in Figs. 11 and 7. The pinion 104 is adapted to engage a stationary rack 105, secured to the bottom of the tank 28 in the path of said pinion and extending from near one end to near the other end of said tank, as best shown in Figs. 7 and 9. As has already been explained, Figs. 6 and 7 show the inlet portion of the tank, while Figs. 8 and 9 show the outlet portion thereof.

From the foregoing description it will be understood that when the pinion 104 is not in engagement with the rack 105 each basket 47 will hang suspended from its shaft 48; but when the pinion 104 engages the rack 105 such baskets 47 will be rotated about the shafts 48 as the baskets progress.

The hoods 102 are mounted similarly to the baskets 47 and are provided at the end opposite the pinions 104 with sleeves 106, which carry pinions 107, similar to the pinions 104, as best shown in Figs. 5 and 6. The pinions 107 are adapted to engage a stationary rack 108, secured in the tank 28 in the path of said pinions, as also shown in Fig. 5. The rack 108 extends nearer the inlet end of the tank 28 than the rack 105, as best shown in Fig. 7. The opposite end of said rack, however, terminates farther from the outlet end of the tank 28 than the rack 105, as shown in Figs. 8 and 9. The object of this arrangement will more fully hereinafter appear. 109 indicates a third rack, which is, in effect, a continuation of the rack 108, as it is located in line with it and between the outlet end of the tank and the adjacent end of the rack 108. (See Fig. 8.)

110 indicates an outlet-chute through which the cans are discharged.

111 indicates a conveyer upon which the discharged cans are received and by which they are conducted away from the tank 28.

112 indicates a fourth rack located above and in line with the path of the pinions 107, as best shown in Fig. 8. Said rack is placed between the rack 108 and the adjacent end of the rack 109, as shown.

113 indicates the top or cover of the tank 28, which extends from near one end of the tank to near the other end thereof, sufficient space being left beyond the ends of the cover 113 for the passage of the baskets, as shown in Figs. 6 and 8. Inclined plates 114 are preferably provided at the inlet end of the tank in order to partially inclose the tank at that end, as shown in Fig. 6.

115 indicates a sprinkler-main which extends endwise of the tank 28, being suspended, preferably, from the cover 113 by hangers 116, as shown in Figs. 6 and 8.

117 indicates sprinkler-pipes which are connected to the main 115 and extend transversely of the tank over the path of the baskets, as shown in Fig. 5. The pipes 117 are perforated on their under sides, so that they discharge upon or into the baskets.

118 indicates a supply-pipe which communicates with the main 115, as shown in Fig. 8. The supply-pipe 118 is provided with suitable valve mechanism (not shown) by which the water-supply may be controlled.

119 indicates deflectors which are suspended from the cover 113 of the tank and serve to distribute the air flowing therethrough.

120 indicates a fan which communicates through a pipe 121 with the interior of the tank 28 and serves to draw air in at the ends thereof and discharge it through a pipe 122, as shown in Fig. 2, thus creating a draft through the tank.

The operation of this part of the apparatus is as follows: The baskets enter the cooling-tank 28 in the position shown at the left in Figs. 6 and 7, both the baskets and the hoods being suspended upon the shaft 48. When any given basket reaches the position A in Fig. 6, its pinion 107 engages the rack 108, causing the hood 102 to rotate, moving in the direction indicated by the arrow in Fig. 6. By the time the position B, Fig. 7, is reached the hood 102 is inverted over the basket 47, so that the basket, with its hood, forms, in effect, a closed cylinder. At this time the pinion 104 reaches the beginning of the rack 105, as shown in Fig. 7, and consequently begins to rotate, moving in the direction indicated by the arrow in Fig. 7. The hood continues to rotate with the basket, since its pinion 107 is still in engagement with the rack 108, and the rotation of both the hood and the basket continues until position C (shown in Fig. 8) is reached. This position marks the termination of the rack 108 and the beginning of the overhead rack 112. The parts are so adjusted that shortly before the position C is reached the basket 47 is in a position corresponding to its normal suspended position, while the hood 102 is inverted over it, as shown in Fig. 8. When the position C is reached, the basket 47 occupies a tilted position, while the hood 102 has been moved slightly beyond such position. The pinion 107 then engages the rack 112, which serves the purpose of moving the hood 102 back sufficiently to restore it to a directly-inverted position, and by the time the end of the rack 112 is reached the basket 47 occupies a similar position, as shown at D in Fig. 8. The chute 110 commences at point C, so that by the time the basket is inverted it lies directly over the chute, and its contents will therefore be discharged thereinto. The rack 109 commences at point D, as shown in Fig. 8, and consequently it there engages the pinion 107 and acts to return the hood 102 to its lower or normal position, as shown at the right in Fig. 8. The rack 105 terminates substantially in line with the end of the rack 109, which lies nearer the outlet, so that the basket 47 returns to its normal position at the same time as the hood 102. The basket then passes out of the tank 28 and is carried around the sprocket-wheels 33, thence passing down and, after receiving another load, entering the processing-tank 25.

In order to enable the operator to readily ascertain the speed of travel of the baskets, I have provided indicating mechanism, which may be placed at any convenient point more or less remote from the processing apparatus itself, such apparatus being illustrated in Figs. 18 to 22, inclusive. Referring to said figures, 123, Fig. 18, indicates an endless belt which is mounted upon suitable mechanism so that it may travel continuously, its operation being dependent upon and synchronous with the endless chain of baskets. In the construction illustrated the chain 123 is supported at one end upon a sprocket-wheel 124, mounted upon a vertical axis 125, supported in a suitable frame 126. At a point removed from the sprocket-wheel 124 the framework 126 carries a second sprocket-wheel, (not shown,) the latter being mounted on a vertical shaft 127, mounted in suitable bearings. Upon the upper end of the shaft 127 is mounted a gear 128, (best shown in Fig. 21,) which is keyed to said shaft and by which said shaft is rotated. The gear 128 meshes with a worm 129, mounted in suitable bearings 130 131, connected with a housing 132, which incloses the gear 128, as shown in Fig. 21. The worm-shaft 133 projects at one side, as shown in Fig. 21, and carries a worm-gear 134, which meshes with a worm 135, mounted on a counter-shaft 136, which carries a pulley 137, connected with the driving mechanism for the series of baskets 47, so that its operation is dependent upon the movement of the baskets. I prefer to make the connections in the manner illustrated in Fig. 2, from which it will be seen that the pulley 137 is connected by a belt 138 with a pulley 139, mounted on the shaft 32. It is desirable that the pulleys 137 139 be in the form of sprocket-wheels and that the belt be a link belt, so that a positive connection is secured between the indicating apparatus and the driving mechanism for operating the baskets. The chain or link belt 123 is supported as it travels by upper guide-rails 140 and lower guide-rails 141, the two rails of each pair being spaced apart a sufficient distance to receive between them rollers 142, which are carried at the ends of cross-heads 143, secured to blocks 144, which are secured to and project from the chain 123 at equally distant intervals. The distance apart of the blocks 144 may be greater or less, depending on the speed of travel of the chain 123. I prefer to place them about a foot apart; but the distance may be arbitrarily varied, as it is not important. A number of such blocks should, however, be employed. Each of the blocks 144 carries a projecting arm 145, which extends beyond the outer surface of the block, as best shown in Fig. 20, and each of said arms carries a finger 146, which projects at right angles thereto and is preferably curved, as shown in Fig. 22. The position of the fingers 146 when in operation is best shown in Figs. 18 and 19. 147 indicates a link belt, preferably in the form of a bicycle-chain, which is mounted on sprocket-wheels 148 149, supported by the frame 126, as best shown in Fig. 18. Preferably the sprocket-wheel 149 is mounted on a shaft 150, supported in a standard 151, resting upon a housing 150$^a$, which extends over the central portion of the frame and overlies the sprocket-wheel 124, as shown in Fig. 21; but it may be otherwise supported, if desired. Also I prefer to support the sprocket-wheel 148 upon a shaft 152, carried by brackets 153, which are connected to the housing 132, as shown in Fig. 18. The sprocket-wheels 148 and 149 rotate upon horizontal axes and lie in substantially the same vertical plane as the fingers 146, so that the chain 147 in traveling upon the sprocket-wheels 148 149 is adapted to be engaged by the fingers 146, as best shown in Fig. 18. 154 indicates a guide-roller secured to one of the rails 140 adjacent to the sprocket-wheel 149, as shown in Fig. 18. 155 indicates a second guide-roller, which is supported by a bracket 156, depending from the housing 132. The roller 155 is placed a short distance above the plane of the chain 123, so that it operates to lift the chain 147 from engagement with the fingers 146 when said fingers reach the opposite end of the machine from that at which they first engage the chain. 157 indicates a pulley around which the chain 147 passes, said pulley being supported by a rod 158 and carrying at its upper end a yoke 159, in which the pivot 160 of said pulley 157 is mounted. The lower end of the rod 158 fits into a sleeve 161, supported upon the base of the machine, so that said rod may telescope into said sleeve. The pulley 157 serves as a tension device for maintaining the proper tension of the chain 147. The sprocket-wheel 148 is driven by means of a pulley 162, mounted on the shaft 152, said pulley being driven by a belt 163 from an independent driving device 164, as best shown in Fig. 21. As illustrated in Fig. 18, the chain 147 is long enough, so that it is adapted to hang suspended in loops, the spaces between successive loops being caught and held by the fingers 146. The operation is as follows: The chain 123 is driven from the baskets, so that it travels when the baskets are being driven, its motion being also intermittent. The chain 147 is driven continuously and by a separate source of power. As the chain 123 is driven its fingers 146 engage the chain 147 immediately below the roller 154, and as each finger moves along the chain 147 drops upon it, so that each finger lies in a loop of the chain 147, as shown in Fig. 18. Obviously the length of the loops suspended from the fingers 146 is constant for any given speed of the chain 123, and if the speed of the chain 123 varies the length of the loops will be increased or shortened, being shorter if the speed of the chain 123 increases and longer if it is reduced. It follows that the operator, by observing the length of the loops of the chain 147, may inform himself of the speed of the baskets of the processing apparatus. In practice a scale is provided showing the length of the loops for different speeds of the baskets; but that is not essential. While in the apparatus as illustrated the chain 123 travels with an intermittent motion, it may be driven constantly without altering the operation of the indicating apparatus. Instead of driving the chain 123 from the baskets or driving mechanism therefor and driving the chain 147 by an independent driving device, it is obvious that the chain 147 may be connected to the driving mechanism which operates the baskets and the chain 123 be driven independently, as all that is necessary is that one of said chains, 123 or 147, be driven independently and at a constant rate of speed and the other be dependent for its operation on the mechanism which drives the baskets.

165 indicates a chute, through which the cans are supplied to the baskets, as shown in Fig. 1.

The operation of the apparatus as a whole is as follows: The empty baskets entering the processing-tank 25 at the right, as shown in Fig. 1, receive the filled and sealed cans from the chute 165 and carry them slowly through said tank, the baskets, with their respective hoods, being at that time suspended from their respective shafts, as shown in Fig. 3. After passing through the tank 25 the baskets pass up over sprocket-wheels 29 30 and thence down through washing-tank 26, thence up over sprocket-wheels 41 42 into tank 27, thence up over sprocket-wheels 45 46 and down into cooling-tank 28. Up to this time the baskets, with their hoods, are suspended from their respective shafts, as described. As they pass through the cooling-tank the hoods and baskets are rotated in the manner already described, meanwhile the baskets being subjected to cooling drafts and sprays. Upon reaching the chute 110 the baskets, with the hoods, are overturned and the cans discharged through said chute upon a conveyer 111, by which they are carried off. The baskets and hoods are then returned to their normal suspended position, when they are ready to receive another load.

It will be noted that by my invention I provide for applying power to the endless series of baskets at a plurality of points in the length thereof for driving them, thereby not only reducing the strain upon the chain formed by the baskets and their connecting devices, but also maintaining the proper slack in the chain of baskets at the desired points. I also provide for driving the baskets intermittently by power applied at a plurality of points in the length thereof, and these features are claimed broadly. I further provide improved mechanism for rotating the cans while they are being cooled and for accurately indicating the speed of the baskets at a point more or less remote therefrom.

While I have described in detail the apparatus illustrated, I wish it to be understood that my invention is not restricted to the details of the construction specifically described, except in so far as they are particularly claimed, my invention including, broadly, the subject-matter of the generic claims.

That which I claim as my invention, and desire to secure by Letters Patent, is—

1. In a processing apparatus, the combination of a plurality of tanks, a series of baskets linked together in the form of an endless chain, said baskets being adapted to move through said tanks, and means for applying power to said chain of baskets at a plurality of points in the length thereof, for driving the same, substantially as described.

2. In a processing apparatus, the combination of a plurality of tanks, a series of baskets linked together in the form of an endless chain, said baskets being adapted to move through said tanks, a motor, and means for transmitting power from said motor to said chain of baskets at a plurality of points in the length thereof, for driving the same, substantially as described.

3. In a processing apparatus, the combination of a plurality of tanks, a series of baskets linked together in the form of an endless chain, said baskets being adapted to move through said tanks, a motor, and ratchet mechanism for transmitting power from said motor to said chain of baskets at a plurality of points in the length thereof, for driving the same, substantially as described.

4. In a processing apparatus, the combination of a plurality of tanks, supporting devices between consecutive tanks, a series of baskets connected together in the form of an endless chain, and adapted to be supported by said supporting devices and to move through said tanks, and means for applying power to said chain of baskets at a plurality of points in the length thereof, for driving the same, substantially as described.

5. In a processing apparatus, the combination of a plurality of tanks, a plurality of supporting devices between consecutive tanks, a series of baskets connected together in the form of an endless chain, and adapted to be supported by said supporting devices and to move through said tanks, sprocket-wheels carried by said supporting devices, and means independent of the baskets for applying power to said sprocket-wheels, for driving the baskets, substantially as described.

6. The combination of a semicylindrical basket, means for supporting and conducting said basket, a semicylindrical hood adapted to co-act with said basket to form a substantially cylindrical closed chamber, and means for moving said hood over said basket, substantially as described.

7. The combination of a semicylindrical basket, means for supporting and conducting said basket, a semicylindrical hood adapted to co-act with said basket to form a substantially cylindrical closed chamber, and means operated by the progressive movement of the basket for moving said hood thereover, substantially as described.

8. The combination of a semicylindrical basket, means for supporting and conducting said basket, a semicylindrical hood adapted to co-act with said basket to form a substantially cylindrical chamber, means for moving said hood over said basket, and means for rotating the hood and basket in unison, substantially as described.

9. In a processing apparatus, the combination of a series of baskets connected together in the form of an endless chain, means for driving said baskets, hoods for said baskets, means for moving said hoods over said baskets, and means for axially rotating said baskets, substantially as described.

10. In a processing apparatus, the combination of a series of semicylindrical baskets connected together in the form of an endless chain, means for driving said semicylindrical baskets, semicylindrical hoods for said semicylindrical baskets, means for moving said semicylindrical hoods over said semicylindrical baskets, and means for axially rotating said semicylindrical baskets, substantially as described.

11. The combination of a tank, a series of baskets movable through said tank, said baskets being connected together in the form of an endless chain, means for moving said baskets through said tank, hoods for said baskets, and means for rotating said baskets and hoods as they move through the tank, substantially as described.

12. The combination of a tank, a series of baskets movable through said tank, said baskets being connected together in the form of an endless chain, means for moving said baskets through said tank, hoods for said baskets, means for automatically moving said hoods over said baskets, and means for rotating said baskets as they move through the tank, substantially as described.

13. The combination of a tank, a series of baskets connected together in the form of an endless chain, means for moving said baskets through said tank, means for rotating said baskets as they move through the tank, and means for dumping said baskets, substantially as described.

14. The combination of a tank, a series of baskets connected together in the form of an endless chain, means for moving said baskets through said tank, hoods for said baskets, means for moving said hoods over said baskets, means for rotating said baskets and hoods as they move through the tank, and means for dumping said baskets, substantially as described.

15. The combination of a tank, a series of baskets connected together in the form of an endless chain, means for moving said baskets through said tank, hoods for said baskets, means for moving said hoods over said baskets, means for rotating said baskets and hoods as they move through the tank, and means for cooling said baskets as they move through the tank, substantially as described.

16. The combination of a tank, a series of baskets connected with one another in the form of an endless chain, said chain being movable through said tank, speed-indicating mechanism, and means operated by said chain of baskets for actuating said speed-indicating mechanism, substantially as described.

17. The combination of a tank, a series of baskets movable therethrough, said baskets being connected together in the form of an endless chain, means for driving said baskets, an indicator-chain connected with said chain of baskets, the speed of said indicator-chain being controlled by the speed of said chain of baskets, a looping chain, supporting devices therefor, independent means for driving said looping chain, and means carried by said indicator-chain for engaging said looping chain and forming loops therein, substantially as described.

18. The combination of a tank, an endless carrier movable therethrough, said carrier having baskets, a traveling indicator-chain, means for driving the same from said carrier, an independently-driven looping chain, and means carried by said indicator-chain adapted to form loops in said looping chain, substantially as described.

19. The combination of a tank, an endless carrier movable therethrough, said carrier having baskets, a traveling indicator-chain, a looping chain, independent means for driving one of said chains at a uniform speed, means for driving the other of said chains from said carrier, and means carried by said indicator-chain adapted to form loops in said looping chain, substantially as described.

20. In a processing apparatus, the combination of a tank, a series of baskets connected together in the form of an endless chain, said baskets being adapted to move through said tank, and means for applying power to said series of baskets at a plurality of points in the length thereof for driving the same, substantially as described.

21. The combination of a tank, a series of baskets connected together in the form of an endless chain, said baskets being adapted to move through said tank, and means for intermittently applying power to said baskets at a plurality of points in the length thereof for driving the same, substantially as described.

22. In a processing apparatus, the combination of a plurality of tanks, a series of baskets connected together in the form of an endless chain, said baskets being adapted to move through said tanks, and means between said tanks for applying power to said baskets at a plurality of points in the length thereof for driving the same, substantially as described.

23. The combination of a tank, a plurality of baskets connected with one another in the form of an endless chain, means for moving said chain of baskets through said tank, means for rotating said baskets with their contents while in said tank, means for automatically closing said baskets before they are rotated, and means for automatically opening said baskets after they have been rotated, substantially as described.

24. The combination of a tank, an open basket, means for pivotally supporting said basket and moving it through the tank, means for rotating said basket, and means for automatically closing said basket so as to retain its contents therein when it is rotated, substantially as described.

25. The combination of an open basket, traveling means pivotally supporting said basket, means for rotating said basket, and means for closing said basket to retain its contents therein when it is rotated, substantially as described.

26. The combination of a semicylindrical basket, means for supporting and conducting said basket, a semicylindrical hood adapted to coact with said basket to form a substantially closed chamber and arranged to swing under said basket when in inoperative position, and means for moving said hood over said basket, substantially as described.

27. The combination of a semicylindrical basket, means for supporting and conducting said basket, a semicylindrical hood adapted to coact with said basket to form a substantially closed chamber and arranged to swing under said basket when in inoperative position, means for moving said hood over said basket, and means for rotating said hood and basket, substantially as described.

HORACE C. GARDNER.

Witnesses:
ALBERT H. ADAMS,
HELEN M. COLLIN.